United States Patent
Chang et al.

(10) Patent No.: US 8,853,980 B2
(45) Date of Patent: Oct. 7, 2014

(54) SOFT-SWITCHING CONTROL CIRCUIT FOR DC MOTOR

(75) Inventors: Chia-Jung Chang, Taoyuan County (TW); Wei-Line Chang, Taichung (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 648 days.

(21) Appl. No.: 13/211,988

(22) Filed: Aug. 17, 2011

(65) Prior Publication Data

US 2013/0043818 A1   Feb. 21, 2013

(51) Int. Cl.
- *H02P 6/18* (2006.01)
- *H02P 6/16* (2006.01)
- *H02P 6/20* (2006.01)
- *H02P 6/00* (2006.01)

(52) U.S. Cl.
CPC *H02P 6/008* (2013.01); *H02P 6/16* (2013.01); *H02P 6/20* (2013.01); *H02P 6/182* (2013.01)
USPC ............ 318/400.06; 318/400.01; 318/400.04; 318/400.32; 318/400.34; 318/700

(58) Field of Classification Search
USPC ............. 318/400.01, 400.04, 400.06, 400.32, 318/400.34, 700
See application file for complete search history.

(56) References Cited

U.S. PATENT DOCUMENTS

| | | |
|---|---|---|
| 7,106,020 B1 | 9/2006 | McMillan |
| 7,501,733 B2 | 3/2009 | Takeuchi |
| 7,747,146 B2 | 6/2010 | Milano et al. |
| 2004/0135529 A1* | 7/2004 | Yoshitomi et al. ............ 318/254 |
| 2009/0134821 A1 | 5/2009 | Ito et al. |
| 2011/0139412 A1* | 6/2011 | Mishima et al. ............... 165/121 |
| 2011/0181214 A1* | 7/2011 | Nakahata et al. ......... 318/400.04 |
| 2013/0009573 A1* | 1/2013 | Chang et al. ............... 318/400.1 |

FOREIGN PATENT DOCUMENTS

TW    20110532 A    3/2011

* cited by examiner

*Primary Examiner* — Kawing Chan
(74) *Attorney, Agent, or Firm* — Li & Cai Intellectual Property (USA) Office (57) ABSTRACT

A soft switching control circuit for a DC motor is provided. The soft switching control circuit has an absolute value generating circuit, a threshold voltage generating circuit, and a comparing circuit. The absolute value generating circuit outputs an absolute value signal according to a pair of Hall signals from the DC motor. The threshold voltage generating circuit receives a detected state signal and at least an end voltage of a coil of the DC motor for determining a current on the coil at an actual state change time defined by the detected state signal. According to the determination, the threshold voltage generating circuit outputs a threshold voltage with an adjusted voltage level. The comparing circuit compares the absolute value signal and the threshold voltage so as to generate a state change adjusting signal for modifying the actual state change time.

13 Claims, 12 Drawing Sheets

| conducted switch | | state description |
|---|---|---|
| M1 | M4 | State I |
|  | M4 | Dead time |
| M3 | M4 | discharging period |
| M3 |  | Dead time |
| M3 | M2 | State II |
| M3 |  | Dead time |
| M3 | M4 | discharging period |
|  | M4 | Dead time |

Fig. 9

SOFT-SWITCHING CONTROL CIRCUIT FOR DC MOTOR

BACKGROUND

1. Technical Field

This invention relates to a control circuit for a DC motor, and more particularly relates to a soft switching control circuit for a DC motor.

2. Description of Related Art

Figure 1:
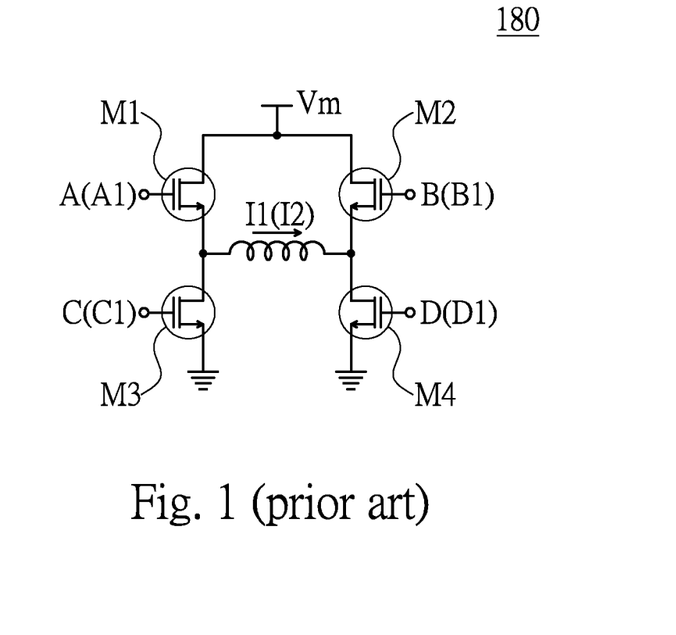
FIG. 1 is a schematic view of a typical DC motor driving circuit.

FIG. 1 is a circuit diagram of a typical DC motor driving circuit. The DC motor driving circuit 180 has four switches M1, M2, M3, and M4 composing an H-bridge circuit to drive the motor. The operation of H-bridge circuit can be divided into two distinct conduction states. In the first conduction state (state I), the switches M1 and M4 are turned on. In the second conduction state (state II), the switches M2 and M3 are turned on.

Figure 2:
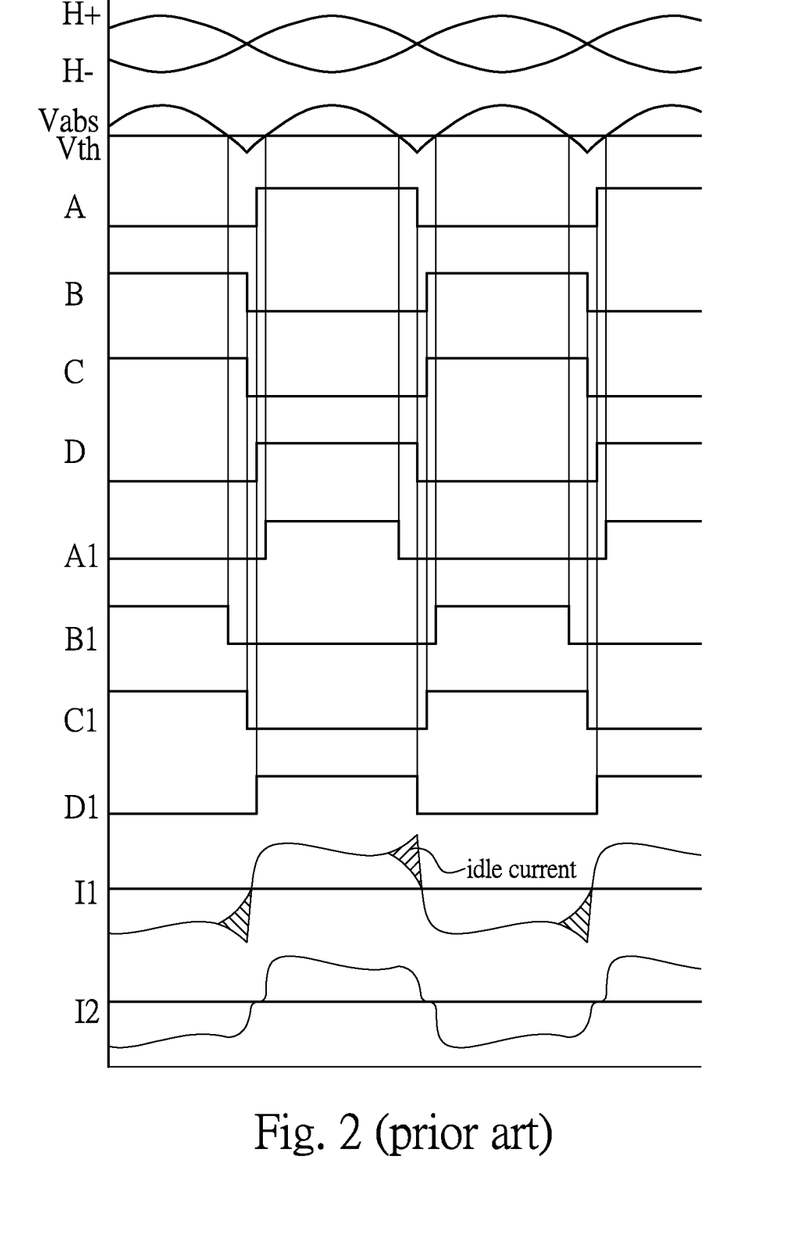
FIG. 2 is a diagram of waveforms of the switching signals A, B, C, and D of the switches in the H-bridge circuit of FIG. 1 as well as waveforms of the adjusted switching signals A1, B1, C1, and D1 and the respective coil current I2 by using a typical soft switching method.

This H-bridge circuit operates in the first conduction state and the second conduction state alternatively to maintain the driving force for the motor. FIG. 2 shows the waveforms of the switching signals A, B, C, and D of the switches M1, M2, M3, and M4 and the coil current I1 on the motor coil. The coil current I1 flowing to the right is defined as a positive current.

The distance between the magnet and the coil is varied attending with the rotation of the motor. Right before reaching the state change time, the movement of the magnetic pole enhances the coil current I1 because of the significant variation of induced electromotive force (emf) generated between the magnet and the coil. However, right after the state change time, the coil current drops suddenly because the state of switches M1, M2, M3, and M4 are changed. The sudden change of coil current may result in the creation of acoustic noise. In addition, since the magnetic field generate by the motor coil lacks the ability to enhance the driving force when the magnetic pole is adjacent to the motor coil, the additional coil current (as indicated by the shaded region, which can be regarded as idle current) generated adjacent to the state change time cannot effectively contribute for driving the motor. The magnetic field generated by the idle current is a waste of power.

The lower part of the diagram in FIG. 2 also shows a typical method dealing with the above mentioned problem. As shown, an absolute value signal Vabs is generated according to the Hall signals H+ and H−. The absolute value signal Vabs and a fixed threshold voltage Vth are compared to form a cyclic signal to define a fixed adjusting time period. The adjusting time period is utilized for adjusting the timing of the rising edge and the falling edge of the original switching signals A and B so as to generate the new switching signals A1 and B1 for discharging the motor coil at a time earlier than that defined by the original switching signal B and charging the motor coil at a time later than the original switching signal A so as to prevent the generation of idle current.

However, this method lacks the flexibility to deal with the variations of motor parameters such as coil current, rotation speed, and etc., and the fixed adjusting time may be too large or too small. If the adjusting time period is too large, a significant time gap with no coil current is generated near the state change time. During the time gap with no coil current, the driving circuit has no driving force and may influence the stability of steady rotation of the DC motor. In contrast, if the adjusting time is too small, the purpose of soft switching control cannot be fulfilled.

SUMMARY

Accordingly, it is a main object of the present invention to provide a soft switching control circuit for solving the above mentioned problem due to the fixed adjusting time.

To achieve the above mentioned object, a soft switching control circuit for a DC motor is provided in accordance with a preferred embodiment of the present invention. The soft switching control circuit has an absolute value generating circuit, a threshold voltage generating circuit, and a comparing circuit. The absolute value generating circuit outputs an absolute value signal according to a pair of Hall signals from the DC motor. The threshold voltage generating circuit receives a detected state signal and at least an end voltage of a coil of the DC motor for determining a current on the coil at an actual state change time defined by the detected state signal. According to the determination, the threshold voltage generating circuit outputs a threshold voltage with an adjusted voltage level. The comparing circuit compares the absolute value signal and the threshold voltage so as to generate a state change adjusting signal for modifying the actual state change time.

According to an embodiment of the present invention, the state change adjusting signal and the detected state signal are fed into a motor control circuit for controlling the switching of the DC motor.

According to an embodiment of the present invention, the soft switching control circuit has a logic circuit for generating an adjusted state signal to replace the detected state signal. The logic circuit generates the adjusted state signal according to the state change adjusting signal and the detected state signal and has the adjusted state signal fed into the motor control circuit for controlling the switching of the DC motor.

BRIEF DESCRIPTION OF THE DRAWINGS

The present invention will now be specified with reference to its preferred embodiment illustrated in the drawings, in which.

DESCRIPTION OF THE EXEMPLARY EMBODIMENTS

Figure 3:
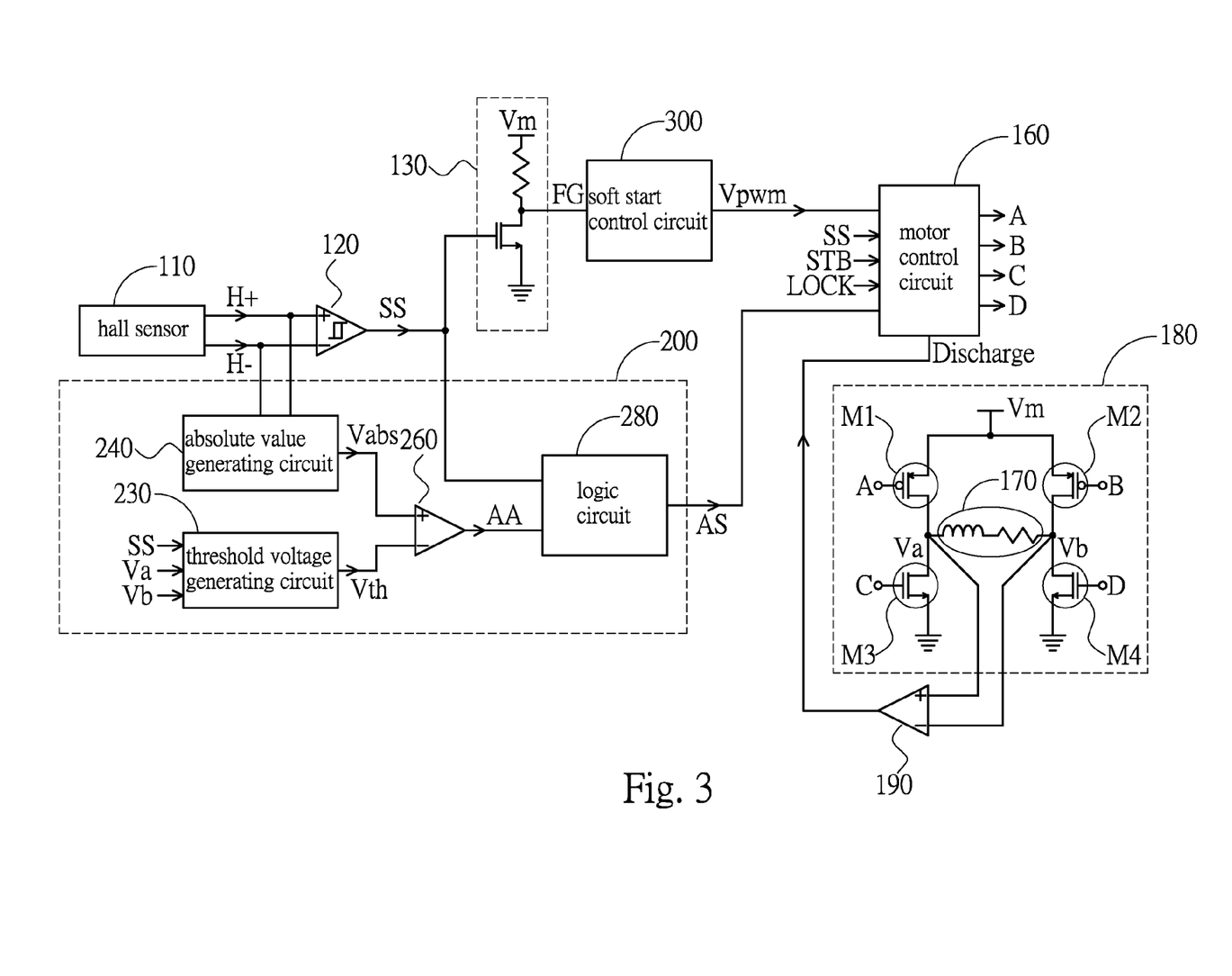
FIG. 3 is a schematic view of a DC motor driving apparatus in accordance with a preferred embodiment of the present invention.

FIG. 3 is a schematic view of a DC motor driving apparatus in accordance with a preferred embodiment of the present invention. The DC motor driving apparatus has a Hall sensor 110, a soft switching control circuit 200, a soft start control circuit 300, a motor control circuit 160, and a motor driving circuit 180. The Hall sensor 110 detects rotation speed of the DC motor and outputs a pair of Hall signals H+ and H−. The Hall signals H+ and H− are then fed in a hysteresis comparator 120 and transformed into a detected state signal SS, which shows the actual state change of the DC motor. The detected state signal SS may be further transformed into a motor speed signal FG by a transforming circuit 130.

The soft switching control circuit 200 detects the voltage level of end voltages Va and Vb at both ends of the motor coil 170, and modifies the detected state signal SS according to the end voltages Va and Vb so as to generate an adjusted state signal AS. The adjusted state signal AS is then fed into the motor control circuit 160 in replace of the detected state signal SS for generating the switching signals A, B, C, and D to control on/off state of the switches M1, M2, M3, and M4 in the motor driving circuit 180.

As shown, the soft switching control circuit 200 has an absolute value generating circuit 240, a threshold voltage generating circuit 230, a comparing circuit 260, and a logic circuit 280. The absolute value generating circuit 240 receives the Hall signals H+ and H− from the Hall sensor 110 and generates an absolute value signal Vabs according to the Hall signals H+ and H−.

Figure 4:
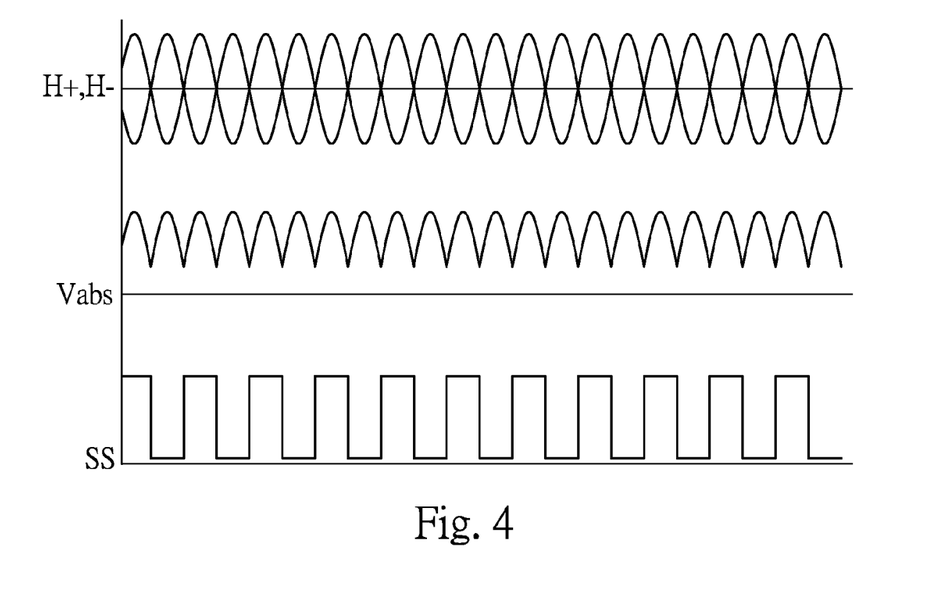
FIG. 4 is a diagram of waveforms of Hall signals H+ and H−, absolute value signal Vabs, and detected state signal SS in FIG. 3.

The waveforms of the Hall signals H+ and H−, the absolute value signal Vabs, and the detected state signal SS are shown in FIG. 4. As shown, the level of the absolute value signal Vabs is in respective to the absolute value of difference between the Hall signals H+ and H−. The detected state signal SS is a square-wave signal with a period in respective to motor speed.

The threshold voltage generating circuit 230 receives the detected state signal SS and the end voltages Va and Vb at the both ends of the motor coil 170 so as to determine the current on the motor coil 170 at the actual state change time represented by the detected state signal SS. According to the determination, the threshold voltage generating circuit 230 adjusts a level of a threshold voltage Vth stored in a capacitor (not shown). For example, if a positive current is generated on the motor coil 170 at the actual state change time, the voltage level of the threshold voltage Vth would be enhanced. Based on the understanding, the threshold voltage Vth for soft-switching control generated in the present embodiment is not kept at a fixed level but would be varied according to the actual condition of DC motor.

The absolute value signal Vabs and the threshold voltage Vth are fed into the comparing circuit 260 for generating a state change adjusting signal AA. In the present embodiment, a positive input of the comparing circuit 260 receives the absolute value signal Vabs, and a negative input thereof receives the threshold voltage Vth. As the level of threshold voltage Vth is enhanced, the low level regions of the state change adjusting signal AA, which is defined by the threshold voltage Vth and the absolute value signal Vabs, would be extended. The absolute value signal Vabs should be greater than a predetermined level determined according to a lower level limit of the threshold voltage Vth to make sure that the above mentioned comparing operation can be carried out. To achieve the above mentioned object, a voltage level shift circuit may be used in the absolute value generating circuit 240 to add the predetermined level to the absolute value of difference between the Hall signals H+ and H− is for ensuring that the absolute value signal Vabs is greater than the predetermined level. The predetermined level can be set according to a lower limit value of the threshold voltage Vth.

The logic circuit 280 receives the detected state signal SS and the state change adjusting signal AA and modifies the actual state change time defined by the detected state signal SS according to the state change adjusting signal AA so as to generate the adjusted state signal AS. The duration of the low level regions of the state change adjusting signal AA covers the timing of the minimum point of the absolute value signal Vabs, which is respective to the actual state change time defined by the detected state signal SS. The logic circuit 280 shifts all the state change time points defined by the detected state signal SS to a respective earlier time according to an adjusted time period defined by the state change adjusting signal AA so as to generate the adjusted state signal AS. That is, the adjusted state signal AS has a waveform identical to the detected state signal SS but with a backward time shift.

In the above mentioned embodiment, the adjusted state signal AS is utilized for replacing the detected state signal SS as a switching control signal for the DC motor. The motor control circuit 160 generates the switching signals A, B, C, and D according to the adjusted state signal AS rather than the detected state signal SS. However, the present invention is not so restricted. In a different embodiment, the motor control circuit 160 may receive the above mentioned state change adjusting signal AA instead of the adjusted state signal AS and generate the switching signals A, B, C, and D according to the state change adjusting signal AA and the detected state signal SS. The state change adjusting signal AA may be used to adjust some of the switching signals A, B, C, and D, or some of the switching time points, the rising edge or the falling edge, of the switching signals A, B, C, and D to be modified. The other portions of the switching time points of switching signals A, B, C, and D are decided accordingly the detected state signal SS. For example, the motor control circuit 160 may merely shift the off time of the switches M1 and M2 to an earlier time according to the state change adjusting signal AA.

Figure 5:
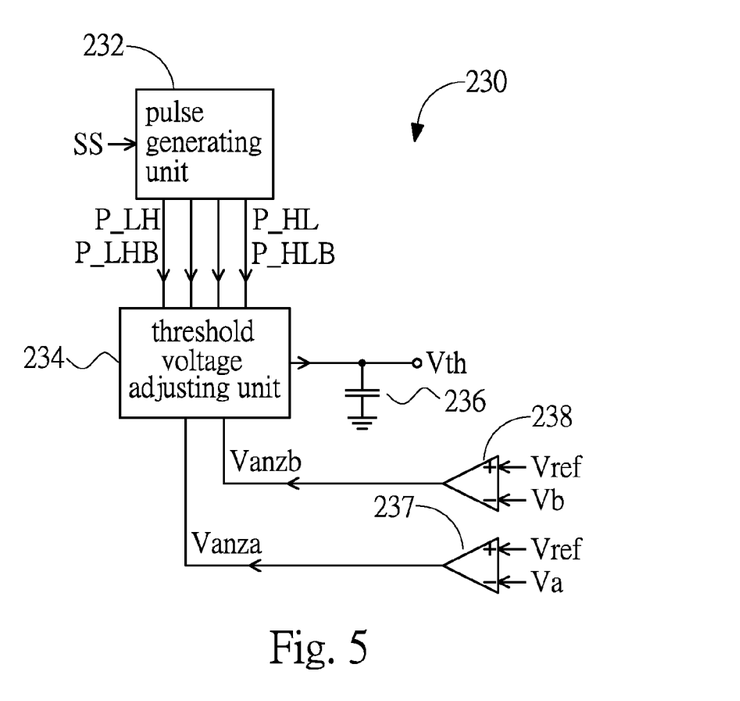
FIG. 5 is a block diagram showing the threshold voltage generating circuit in accordance with a preferred embodiment of the present invention.

FIG. 5 is a block diagram of the threshold voltage generating circuit 230 in accordance with a preferred embodiment of the present invention. As shown, the threshold voltage generating circuit 230 has a pulse generating unit 232, a threshold voltage adjusting unit 234, a capacitor 236, a first comparator 237, and a second comparator 238. The first comparator 237 receives the end voltage Va from the motor coil 170 and a reference voltage Vref so as to generate a first comparing signal Vanza. The second comparator 238 receives the other end voltage Vb and the reference voltage Vref so as to generate a second comparing signal Vanzb. The above mentioned reference voltage Vref is determined according to the actual demand. In addition, the reference voltages Vref applied to the first comparator 237 and the second comparator 238 may be different.

In the present embodiment, two comparators 237 and 238 are used for generating two different comparing signals Vanza and Vanzb respective to rightward and leftward current on the motor coil 170. However, the present invention is not so restricted. As a preferred embodiment, the end voltages Va and Vb may be compared directly for identifying the existence of coil current. For example, the end voltages Va and Vb may be fed into a comparator, and the comparing result of the comparator is capable to show the direction of coil current. Thus, the output signal of the comparator may be utilized for determining the coil current so as to adjust the threshold voltage Vth.

The pulse generating unit 232 receives the detected state signal SS and generates pulse signals P_LH, P_HL, P_LHB, and P_HLB based on the state change time determined by the detected state signal SS. Each pulse in the pulse signal P_LH represents low-to-high level shifting time of the detected state signal SS. The pulse signal P_LHB is a reverse signal of the pulse signal P_LH. Similarly, each pulse in the pulse signal P_HL represents high-to-low level shifting time of the detected state signal SS, and the pulse signal P_HLB is a reverse signal of the pulse signal P_HL. The threshold voltage adjusting unit 234 receives the above mentioned comparing signals Vanza and Vanzb as well as the pulse signals P_LH, P_LHB, P_HL, and P_HLB for controlling the charging and discharging operations of the capacitor 236. Thus, the level of the threshold voltage Vth generated at the high level side of the capacitor 236 can be adjusted.

Figure 5A:
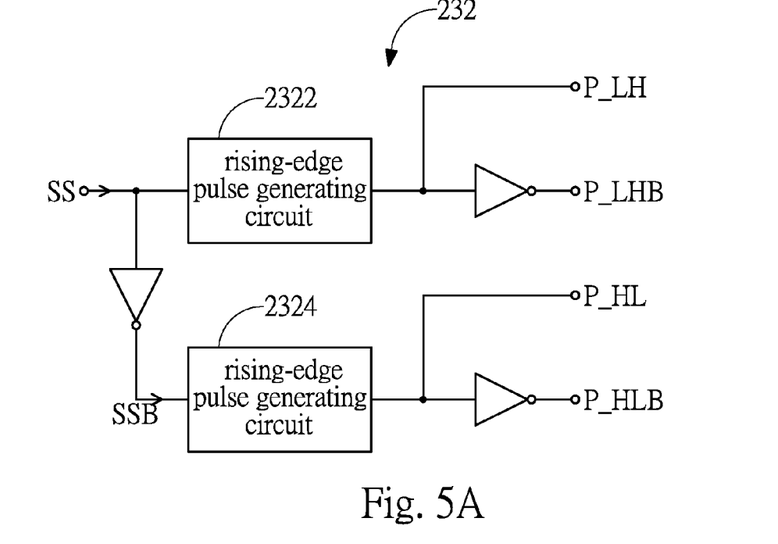
FIG. 5A is a schematic view of the pulse generating unit in FIG. 5 in accordance with a preferred embodiment of the present invention.
Figure 5B:
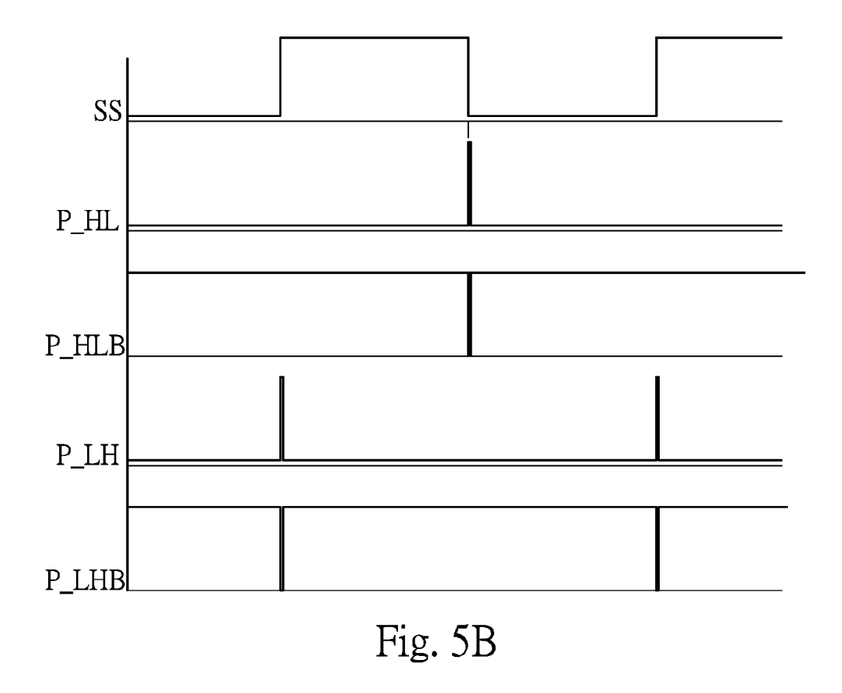
FIG. 5B is a diagram of waveforms showing the pulse signals generated by the pulse generating unit of FIG. 5A.

FIG. 5A is a schematic view showing the pulse generating unit 232 in FIG. 5 in accordance with a preferred embodiment of the present invention. FIG. 5B is a diagram of waveforms showing the pulse signals generated by the pulse generating unit 232. As shown, the detected state signal SS is fed into a rising-edge pulse generating circuit 2322 for generating a first pulse signal P_LH with pulses corresponding to the timing the detected state signal SS shifted from low to high. Meanwhile, the detected state signal SS is transformed into a reversed detected state signal SSB by an inverter, and the reversed detected state signal SSB is fed into another rising-edge pulse generating circuit 2324 for generating a second pulse signal P_HL with pulses corresponding to the timing the detected state signal SS shifted from high to low. The first pulse signal P_LH is further transformed into a third pulse signal P_LHB by an inverter, and the second pulse signal P_HL is further transformed into a fourth pulse signal P_HLB by another inverter. Thereby, four different pulse signals P_LH, P_HL, P_LHB, and P_HLB are generated according to the detected state signal SS.

The above mentioned pulse generating unit 232 generates the pulse signals P_LH, P_HL, P_LHB, and P_HLB by using the rising-edge pulse generating circuits 2322 and 2324. However, the present invention is not so restricted. Falling-edge pulse generating circuits or a combination of rising-edge and falling-edge pulse generating circuits are also applicable for generating the pulse signals P_LH, P_HL, P_LHB, and P_HLB in the present embodiment.

Figure 5C:
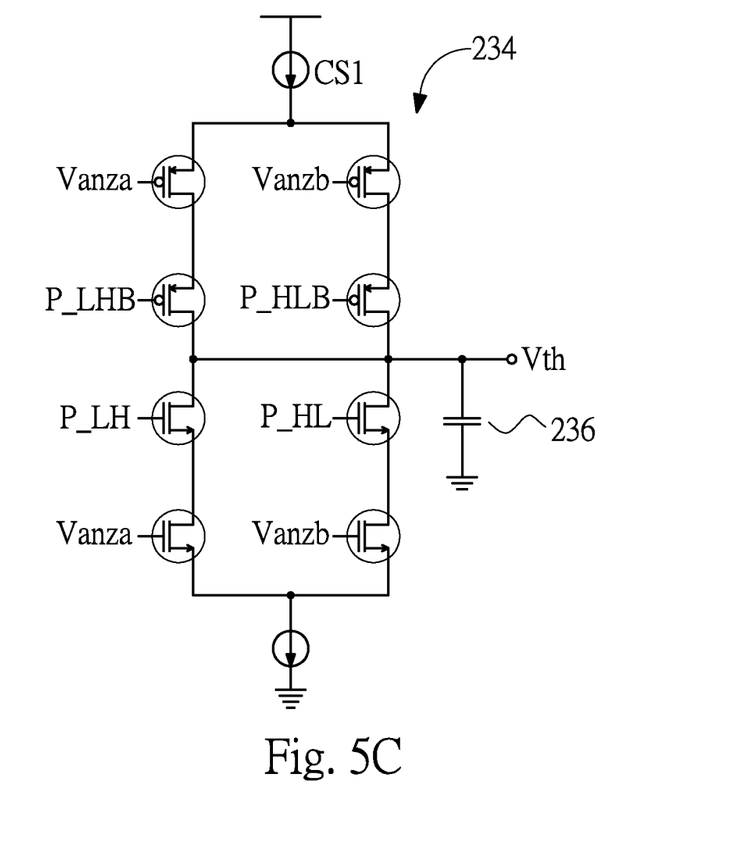
FIG. 5C is a schematic view of the threshold voltage adjusting unit in FIG. 5 in accordance with a preferred embodiment of the present invention.

FIG. 5C is a schematic view showing the threshold voltage adjusting unit 234 in FIG. 5 in accordance with a preferred embodiment of the present invention. As shown, there are two charging paths and two discharging paths defined in the threshold voltage adjusting unit 234. The on/off state of the first charging path is decided according to the two serially connected high-side switches controlled by the first comparing signal Vanza and the pulse signal P_LHB respectively. The on/off state of the second charging path is decided according to the two serially connected high-side switches controlled by the second comparing signal Vanzb and the pulse signal P_HLB respectively. The on/off state of the first discharging path is decided according to the two serially connected low-side switches controlled by the first comparing signal Vanza and the pulse signal P_LH respectively. The on/off state of the second discharging path is decided according to the two serially connected low-side switches controlled by the second comparing signal Vanzb and the pulse signal P_HL respectively.

In the present embodiment, the P-type transistors are used as the high-side switches and the N-type transistors are used as the low-side switches of the threshold voltage adjusting unit 234. When both the first comparing signal Vanza and the pulse signal P_LHB are low, the first charging path would be conducted. When both the second comparing signal Vanzb and the pulse signal P_HLB are low, the second charging path would be conducted. When both the first comparing signal Vanza and the pulse signal P_LH are high, the first discharging path would be conducted. When both the second comparing signal Vanzb and the pulse signal P_HL are high, the second discharging path would be conducted.

That is, when the end voltage Va is greater than the reference voltage Vref at the switching time that the detected state signal SS is switched from low to high, both the first comparing signal Vanza and the pulse signal P_LHB are low and thus the first charging path would be conducted to have the current source CS1 charging the capacitor 236 to enhance the level of the threshold voltage Vth. At the same time, the first discharging path is off because of the low level of the first comparing signal Vanza. In addition, referring to FIG. 5B, as the pulse signal P_LHB is low, the pulse signals P_LH and P_HLB must be high and the pulse signal P_HL must be low. Thus, both the second charging path and the second discharging path are also cut off.

Similarly, when the end voltage Vb is greater than the reference voltage Vref at the timing the detected state signal SS is shifted from high to low, both the second comparing signal Vanzb and the pulse signal P_HLB are low and thus the second charging path is conducted to have the current source CS1 charging the capacitor 236 to enhance the level of the threshold voltage Vth. Meanwhile, the first charging path, the first discharging path, and the second discharging path are all cut off.

On the other hand, when the end voltage Va is smaller than the reference voltage Vref at the timing the detected state signal SS is shifted from low to high, both the first comparing signal Vanza and the pulse signal P_LH are high and thus the first discharging path is conducted to discharge the capacitor 236 so as to reduce the level of the threshold voltage Vth. Meanwhile, the second discharging path, the first charging path, and the first discharging path are all cut off. Similarly, when the end voltage Vb is smaller than the reference voltage at the timing the detected state signal SS is shifted from high to low, both the second comparing signal Vanzb and the pulse signal P_HL are high and thus the second discharging path is conducted to discharge the capacitor 236 so as to reduce the level of the threshold voltage Vth. Meanwhile, the first charging path, the first discharging path, and the second charging path are all cut off.

In conclusion, at the actual state change time in respective to the condition that the detected state signal SS is shifted from low to high, if the first comparing signal Vanza is low to show that the end voltage Va is greater than the reference voltage Vref, the level of the threshold voltage Vth would be enhanced. On the other hand, if the first comparing signal Vanza is high to show that the end voltage Va is lower than the reference voltage Vref, the level of the threshold voltage Vth would be reduced. Similarly, at the actual state change time in respective to the condition that the detected state signal SS is shifted from high to low, if the second comparing signal Vanzb is low to show that the end voltage Vb is greater than the reference voltage Vref, the level of the threshold voltage Vth would be enhanced. On the other hand, if the second comparing signal Vanzb is high, the level of the threshold voltage Vth would be reduced.

In the above mentioned embodiment, the first charging path is conducted when both the first comparing signal Vanza and the pulse signal P_LHB are low. However, the present invention is not so restricted. Based on the type of transistors being used as the switches in the threshold voltage adjusting unit 234, the first charging path may be set as being conducted when the first comparing signal Vanza is low and the pulse signal P_LH is high. In addition, it is also applicable to have the first charging path set as being conducted when both the first comparing signal Vanza and the pulse signal P_LH are high with the high level first comparing signal Vanza representing the condition that the end voltage Va is higher than the reference voltage Vref. The switches on the second charging path, the first discharging path, and the second discharging path may be also arranged in the same way. Moreover, as the pulse signal P_LH is used to control the switches on both the first charging path and the first discharging path and the pulse signal P_HL is used to control the switches on both the second charging path and the second discharging path, the pulse signals P_LHB and P_HLB may be skipped.

In addition, on/off state of each of the charging paths and discharging paths in the threshold voltage adjusting unit 234 of the present embodiment is controlled by two serially connected switches. However, the present invention is not so restricted. When choosing a single pulse signal P_LH to control the on/off state of the first charging path and the first discharging path, the switch controlled by the pulse signal P_LH may be shared to the two paths so as to reduce the number of switches being used in the threshold voltage adjusting unit 234. Similarly, the switch controlled by the pulse signal P_HL may be shared to the second charging path and the second discharging path.

The threshold voltage generating circuit 230 in the present embodiment detects the end voltages Va and Vb at both ends of the motor coil 170 for adjusting the level of the threshold voltage Vth. However, the present invention is not so restricted. The threshold voltage generating circuit 230 may be operated according to merely a single end voltage Va from the motor coil 170. In such situation, only the first charging path and the first discharging path are established in the threshold voltage adjusting unit 234, and only the pulse signals P_LH and P_LHB generated by the pulse generating unit 232 are needed for controlling the first charging path and the first discharging path to adjust the level of the threshold voltage Vth.

According to the above mentioned embodiment, because the switching time of the motor driving circuit 180 is adjusted according to the end voltages Va and Vb of the motor coil 170, the switching time can be adaptively modified in respective to the actual condition of the DC motor, such as the variations of coil current, rotation speed, and other parameters. Thus, the soft switching control circuit 200 provided in the present invention is able to overcome the disadvantages of the traditional soft switching control method which lacks the flexibility due to the fixed amount of adjusting time period.

Figure 5D:
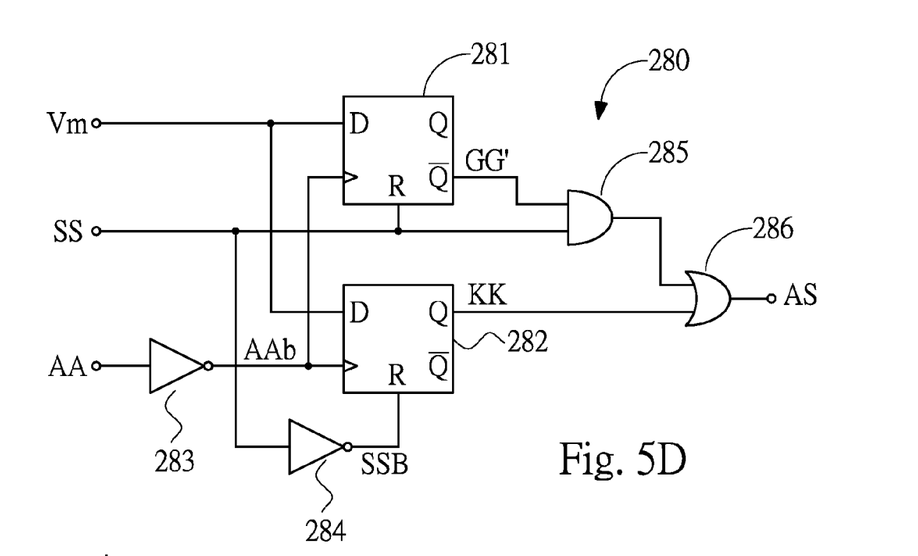
FIG. 5D is a schematic view of the logic circuit in accordance with a preferred embodiment of the present invention.
Figure 5E:
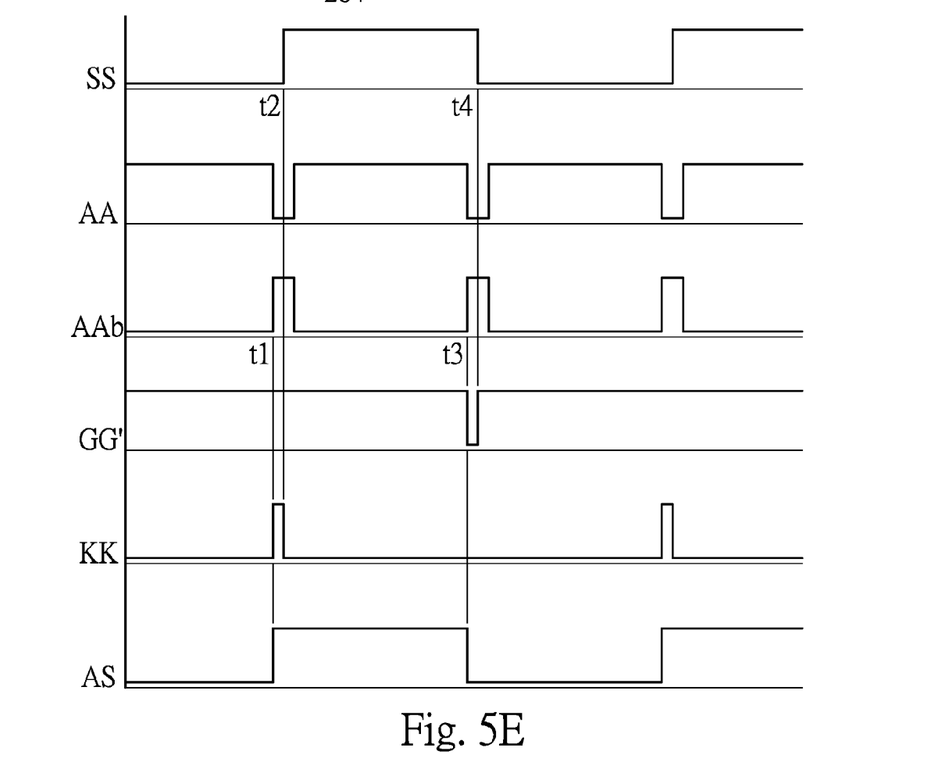
FIG. 5E is a diagram of waveforms showing the signals relative to the operation of the logic circuit of FIG. 5D.

FIG. 5D is a schematic view of the logic circuit 280 in accordance with a preferred embodiment of the present invention. FIG. 5E is a diagram of waveforms showing the signals generated by the logic circuit 280. As shown, the logic circuit 280 has a first flip-flop 281, a second flip-flop 282, an AND gate 285, and an OR gate 286. The reversed state change adjusting signal AAb of the state change adjusting signal AA is fed into the first flip-flop 281 and the second flip-flop 282 as the clock input. The detected state signal SS is fed into the first flip-flop 281 as the reset input. The reversed detected state signal SSB is fed into the second flip-flop 282 as the reset input. An inverted output GG' of the first flip-flop 281 and the detected state signal SS are fed into the AND gate 285. The output of the AND gate 285 and a non-inverted output KK of the second flip-flop 282 are further fed into the OR gate 286, and the OR gate 286 outputs the adjusted state signal AS.

At time point t1, while the reversed state change adjusting signal AAb is shifted from low to high and the reversed detected state signal SSB stays at high, the non-inverted output KK of the second flip-flop 282 is shifted from low to high. Thereafter, at time point t2, when the reversed detected state signal SSB is shifted from high to low, the high level non-inverted output KK is stopped. Then, at time point t3, although the reversed state change adjusting signal AAb is shifted from low to high again, the non-inverted output KK of the second flip-flop 282 still stays at low because the reversed detected state signal SSB is low. At this time, since the detected state signal SS is high, the inverted output GG' of the first flip-flop 281 would be shifted from high to low. Thereafter, at time point t4, when the detected state signal SS is shifted from high to low, the inverted output GG' of the first flip-flop 281 is shifted from low to high. Then, when the reversed state change adjusting signal AAb is shifted from low to high again, the inverted output GG' of the first flip-flop 281 will stay at high because of the low level detected state signal SS.

At time point t1, when the reversed state change adjusting signal AAb is shifted from low to high, the non-inverted output KK of the second flip-flop 282 is shifted to high, and thus the OR gate 286 outputs a high level adjusted state signal AS. Then, at time point t2, the detected state signal SS is shifted from low to high and the inverted output GG' of the first flip-flop 281 is high such that the output of the AND gate 285 is shifted to high. At this time, although the non-inverted output KK of the second flip-flop 282 is shifted from high to low, the adjusted state signal AS outputted from the OR gate 286 is still high because of the high level output of the AND gate 285. Thereafter, at time point t3, when the reversed state change adjusting signal AAb is shifted from low to high again, the inverted output GG' of the first flip-flop 281 is shifted to low, and thus the output signal of the AND gate 285 is shifted to low and the adjusted state signal AS outputted from the OR gate 286 is shifted from high to low.

As mentioned, the logic circuit 280 shifts the timing of the adjusted state signal AS backward to an earlier time point with respect to the timing of the detected state signal SS according to the state change adjusting signal AA. The longer time period the state change adjusting signal AA stays at low, the longer time period the detected state signal SS is switched backward to form the adjusted state signal AS. It is also noted that although the timing of rising edges of the adjusted state signal AS is shifted to an earlier time point with respect to the detected state signal SS, the length the adjusted state signal AS stayed at high is substantially identical to that of the detected state signal SS.

Figure 5F:
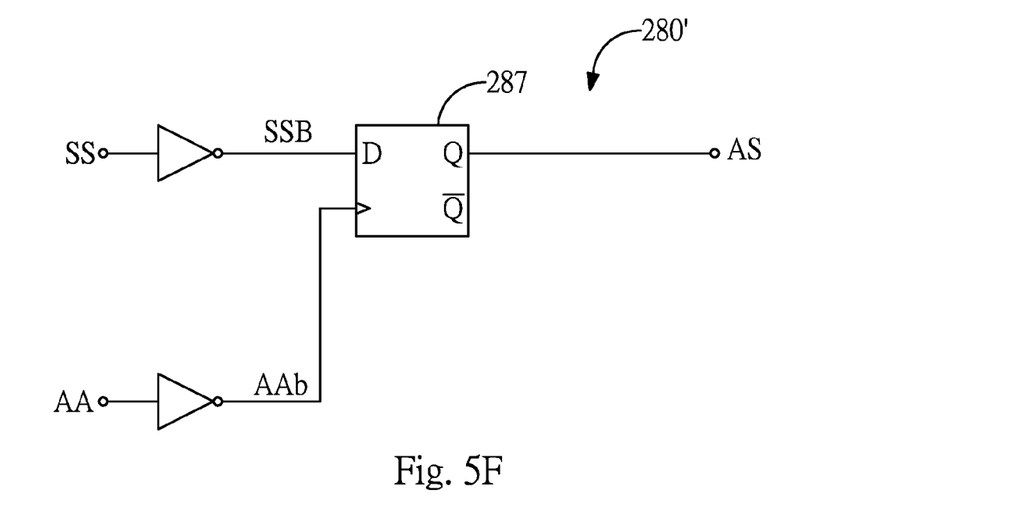
FIG. 5F is a schematic view of the logic circuit in accordance with another preferred embodiment of the present invention.
Figure 5G:
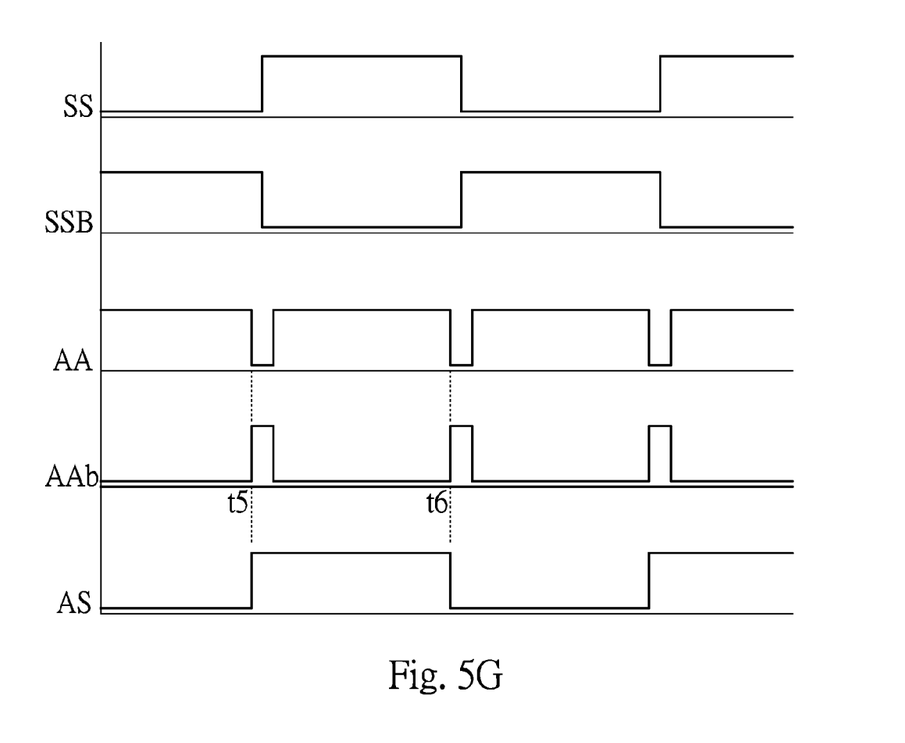
FIG. 5G is a diagram of waveforms showing the signals relative to the operation of the logic circuit of FIG. 5F.

FIG. 5F is a schematic view of the logic circuit 280' in accordance with another preferred embodiment of the present invention. FIG. 5G is a diagram of waveforms showing the signals generated by the logic circuit 280'. The logic circuit 280' has a flip-flop 287. A reversed state change adjusting signal AAb of the state change adjusting signal AA is fed into the flip-flop 287 as a clock input. A reversed detected state signal SSB of the detected state signal SS is fed into the flip-flop 287 as the data input. A non-inverted output signal of the flip-flop 287 is the adjusted state signal AS.

At time point t5 in the FIG. 5G, when the reversed state change adjusting signal AAb is shifted from low to high and the reversed detected state signal SSB stays at high, the adjusted state signal AS of the first flip-flop 287 non-inverted output is shifted from low to high. Then, at time point t6, when the reversed state change adjusting signal AAb is shifted from low to high again, the reversed detected state signal SSB stays at low. At the time, the adjusted state signal AS is shifted from high to low.

Figure 6:
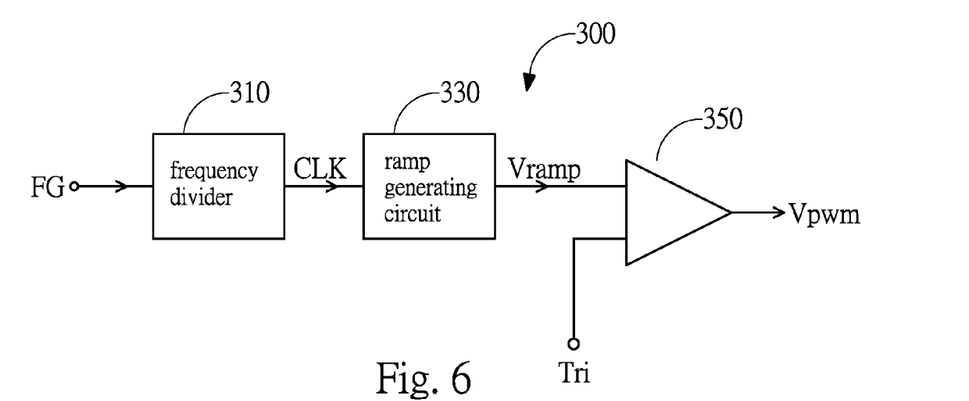
FIG. 6 is a block diagram of the soft start control circuit in accordance with an embodiment of the present invention.

FIG. 6 is a block diagram of a soft start control circuit 300 in accordance with a first embodiment of the present invention. As shown, the soft start control circuit 300 has a frequency divider 310, a ramp generating circuit 330, and a comparator 350. A motor speed signal FG is fed into the frequency divider 310 for generating a clock signal CLK. The ramp generating circuit 330 receives the clock signal CLK for generating a ramp signal Vramp. The comparator 350 receives the ramp signal Vramp and a triangular signal Tri with a predetermined frequency so as to generate a pulse width modulation signal Vpwm. The pulse width modulation signal Vpwm is then fed into the motor control circuit 160 for controlling conduction time of the switches M1, M2, M3, and M4 in the motor driving circuit 180. Thereby, charging time of the motor coil 170 can be adjusted to calibrate the driving force applied to the rotor for the purpose of soft start control.

Figure 6A:
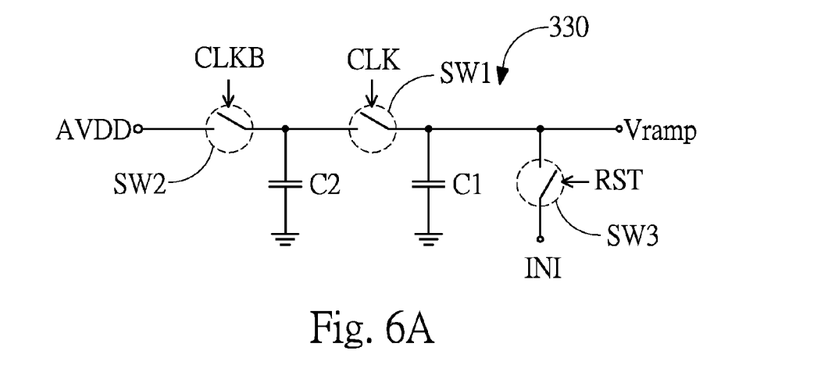
FIG. 6A is a circuit diagram of the charge pump in FIG. 6 in accordance with an embodiment of the present invention.

FIG. 6A is a circuit diagram of the ramp generating circuit 330 of FIG. 6 in accordance with a first embodiment of the present invention. As shown, the ramp generating circuit 330 has a first capacitor C1, a second capacitor C2, a first switch SW1, a second switch SW2, and a third switch SW3. Wherein, the first capacitor C1 has a capacitance value greater than that of the second capacitor C2, and the ramp signal Vramp is outputted from the high level side of the first capacitor C1. The state of the first switch SW1 is controlled by the clock signal CLK, the state of the second switch SW2 is controlled by the reversed clock signal CLKB of the clock signal CLK, and the state of the third switch SW3 is controlled by a reset signal RST.

When the DC motor driving system is activated, a pulse signal is generated as the reset signal RST to activate the soft start control circuit 300. At this time, the third switch SW3 is conducted and an initial voltage INI is utilized for charging the first capacitor C1 so as to set an initial value of the ramp signal Vramp. Then, the clock signal CLK is changed between a low level and a high level alternatively. As the clock signal CLK is low, the switch SW2 is turned on such that the power source AVDD charges the second capacitor C2. As the clock signal CLK is high, the switch SW2 is cut off and the power source AVDD stops charging the second capacitor C2, but the switch SW1 is conducted and the charges stored in the second capacitor C2 is utilized for charging the first capacitor C1. Since the capacitance of the first capacitor C1 is greater than the second capacitor C2, the level of the high level side of the first capacitor C1 will be gradually increased during the alternative charging processes to the first capacitor C1 and the second capacitor C2 such that the ramp signal Vramp is generated.

The frequency divider 310 is utilized for generating the clock signal CLK with a frequency showing a predetermined relationship with respect to that of the motor speed signal FG. The level of the ramp signal Vramp would be enhanced attending with the alternative level changes of the clock signal CLK so as to increase the duty cycle of the pulse width modulation signal Vpwm. When the level of the ramp signal Vramp exceeds the peak level of the triangular signal Tri, and the duty cycle of the pulse width modulation signal Vpwm outputted by the comparator 350 reaches 100% such that the soft starting control period is finished. Based on the above mentioned operation, the soft start control circuit 300 provided in the present invention increases the duty cycle of the pulse width modulation signal Vpwm based to the increasing number of rotation cycles so as to achieve the object of soft start control.

In the present embodiment, the frequency divider 310 is used for dividing a frequency of the motor speed signal FG to generate the clock signal CLK for controlling the frequency to charge the second capacitor C2. However, the present invention is not so restricted. The above mentioned motor speed signal FG may be replaced by the detected state signal SS or even the adjusted state signal AS. In addition, if the frequency dividing ratio between the motor speed signal FG and the clock signal CLK is 1:1, the frequency divider 310 may be skipped.

Figure 6B:
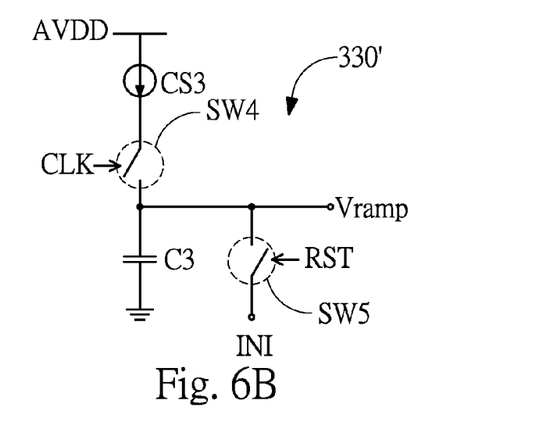
FIG. 6B is a circuit diagram of the charge pump in FIG. 6 in accordance with another embodiment of the present invention.

FIG. 6B is a circuit diagram of the ramp generating circuit 330' in accordance with a second embodiment of the present invention. As shown, the ramp generating circuit 330' has a current source CS3, a fourth switch SW4, a fifth switch SW5, and a third capacitor C3. The output signal from the high level side of the third capacitor C3 is the ramp signal Vramp. The state of the fourth switch SW4 is controlled by the clock signal CLK. The state of the fifth switch SW5 is controlled by the reset signal RST, and it plays a similar role as the third switch SW3 in the above mentioned embodiment. When the clock signal CLK is high, the fourth switch SW4 is turned on and the current source CS3 begins charging the third capacitor C3 to enhance the level of the high level side of the third capacitor C3. When the clock signal CLK is low, the fourth switch SW4 is turned off and the current source CS3 stops charging the third capacitor C3. The ramp signal Vramp with a gradually increased level would be generated attending with the level changes of the clock signal CLK.

Figure 7:
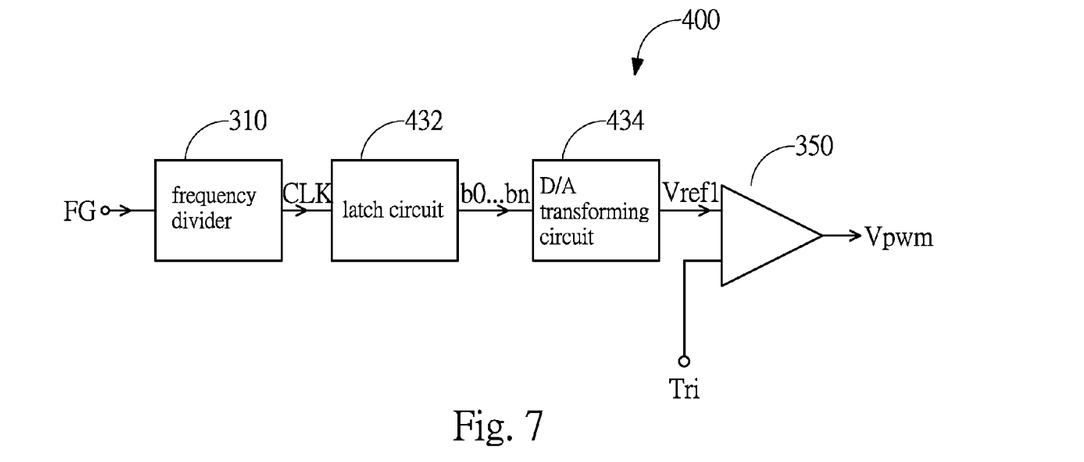
FIG. 7 is a block diagram of the soft start control circuit in accordance with another embodiment of the present invention.

FIG. 7 is a block diagram showing a soft start control circuit 400 in accordance with a second embodiment of the present invention. As shown, a major difference between the present embodiment and the embodiment of FIG. 6 is that the ramp generating circuit 330 in FIG. 6 is replaced by a latch circuit 432 and a digital-to-analog (D/A) transforming circuit 434. As shown, the latch circuit 432 generates a plurality of binary digital signals b0, b1, b2 . . . and bn according to the clock signal CLK. The D/A transforming circuit 434 generates a reference voltage signal Vref1 based on the digital signals b0, b1, b2 . . . and bn.

Figure 7A:
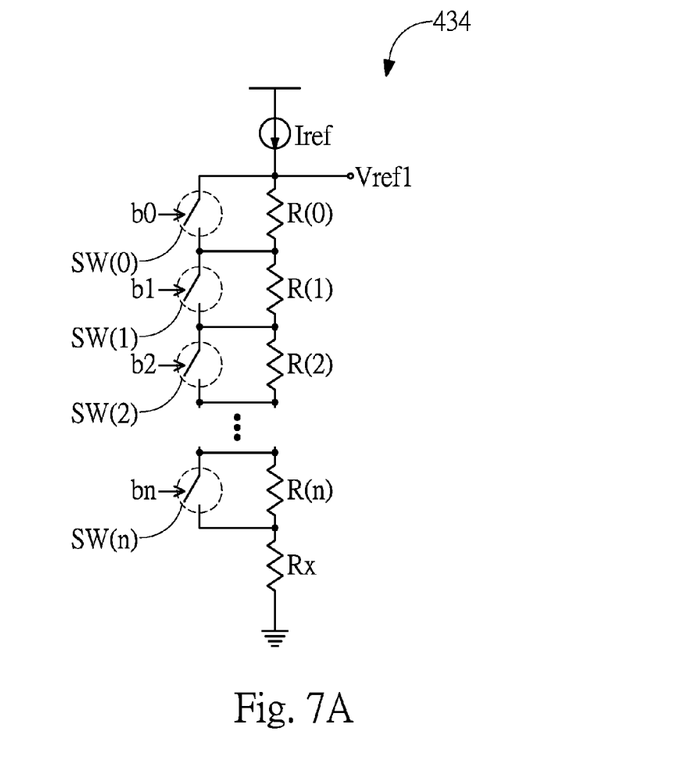
FIG. 7A is a circuit diagram of the digital-to-analog transforming circuit in FIG. 7 in accordance with a preferred embodiment of the present invention.

FIG. 7A is a circuit diagram showing the D/A transforming circuit 434 in FIG. 7 in accordance with a preferred embodiment of the present invention. As shown, the D/A transforming circuit 434 has a current source Iref, a plurality of resistors R(0), R(1) . . . R(n) and Rx, and a plurality of switches SW(0), SW(1) . . . and SW(n). The resistors R(0), R(1) . . . R(n) and Rx are connected in serial between the current source Iref and a ground. At least some of the resistors R(0), R(1) . . . and R(n) have a respective switch SW(0), SW(1) . . . and SW(n) connected in parallel. The state of the switches SW(0), SW(1) . . . and SW(n) are controlled by the above mentioned digital signals b0, b1, b2 . . . and bn respectively. The reference voltage signal Vref1 is outputted from the node between the current source Iref and the resistor string.

As shown, the level of the reference voltage signal Vref1 is varied according to the state of the switches SW(0), SW(1) . . . and SW(n). In detail, as the switches SW(0), SW(1) . . . and SW(n) are turned on by the respective digital signals b0, b1 . . . and bn, the electric current flow would be detoured through the path composed of the conducted switches SW(0), SW(1) . . . and SW(n) rather than the respective resistors R(0), R(1) . . . and R(n). As the amount of switches SW(0), SW(1) . . . and SW(n) being turned on are increased, the level of the reference voltage signal Vref1 would be decreased because of fewer resistors R(0), R(1) . . . and R(n) contributed to the reference voltage signal Vref1.

In the present embodiment, the number of high level digital signals b0, b1, b2 . . . and bn outputted by the latch circuit 432 is determined according to the number of level changes of the clock signal CLK. For example, as the clock signal CLK indicates that one rotation cycle has completed in the soft start process, the latch circuit 432 outputs the high level digital signal b0 for turning off the switch SW(0) but has the other digital signals b1, b2 . . . and bn remained at low level for keeping the rest of the switches in "ON" status. Thereafter, as the clock signal CLK indicates that another rotation cycle has completed, the latch circuit 432 outputs the high level digital signal b1 in addition to the original high level digital signal b0. The switches SW(0) and SW(1) are in "OFF" status and other switches SW(2), SW(3) . . . are remained in "ON" status. Based on the above mentioned operations, the level of the reference voltage signal Vref1 would be enhanced attending with the increasing number of rotation cycles.

In addition to the soft switching control circuit 200, the motor driving apparatus in FIG. 3 also has a reverse current prohibiting circuit 190 to prevent the reverse current generated in the motor driving circuit 180 during the state change period.

As shown, the motor control circuit 160 controls the rotation of motor through a motor driving circuit 180 with four switches M1, M2, M3, and M4 composing an H-bridge circuit for driving the motor. The operation of the H-bridge circuit can be divided into two distinct conduction states. In the first conduction state (state I), the switches M1 and M4 are turned on. In the second conduction state (state II), the switches M2 and M3 are turned on.

Right after the motor driving circuit 180 has been switched from the first conduction state (state I) to the second conduction state (state II), the induction current flowing toward the right side of this figure would be substantially maintained at a threshold value and thus a significant reverse current flowing back to the power end Vm is generated. To prevent the reverse current from damaging the circuit, a reverse current prohibiting circuit 190 is provided in the motor driving apparatus of the present invention. The reverse current prohibiting circuit 190 detects the level of end voltages Va and Vb at both ends of the motor coil 170 such that the on/off state of the switches M1, M2, M3, and M4 are controlled according to the comparing result of the two levels of end voltages Va and Vb.

Figure 8:
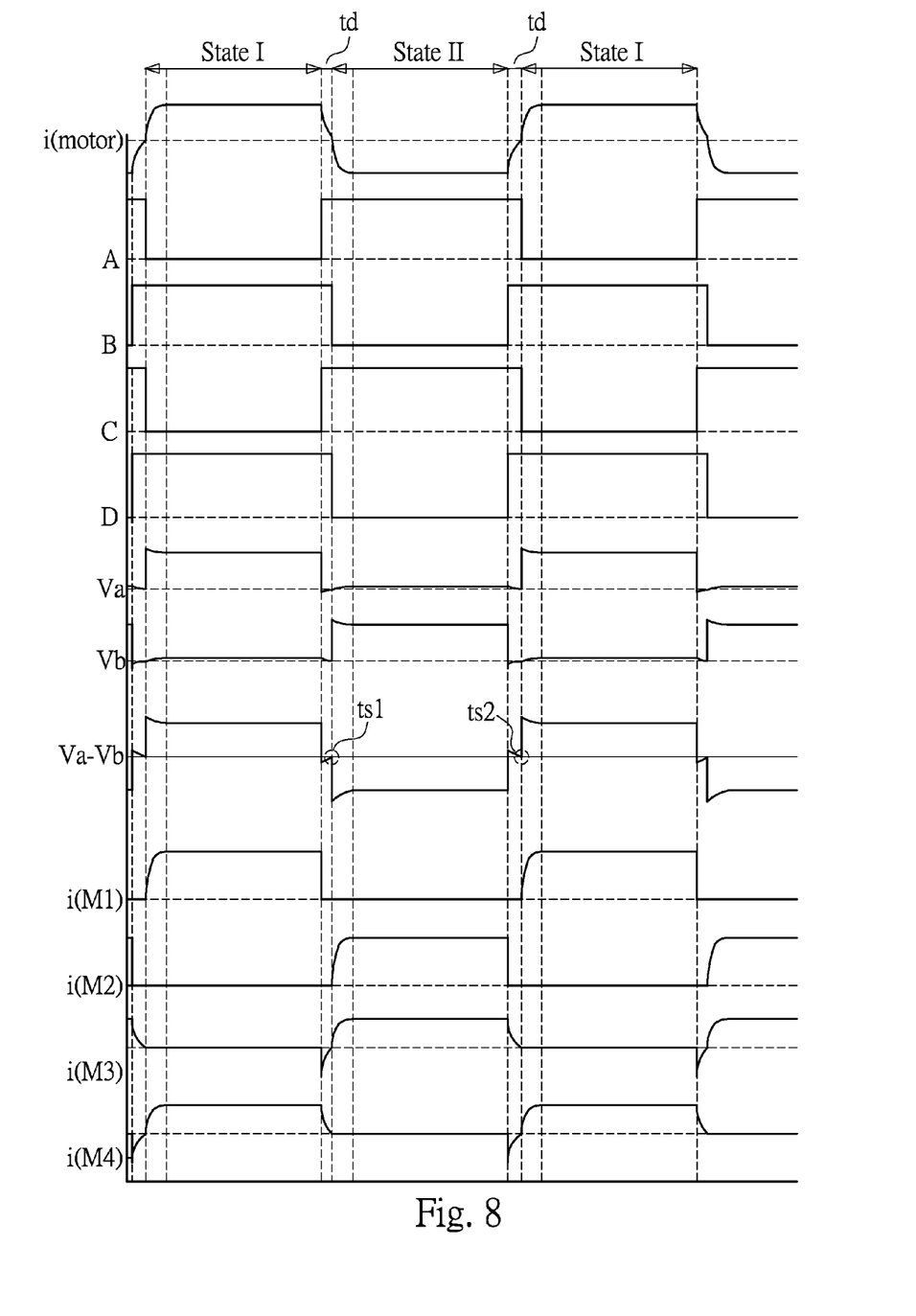
FIG. 8 is a timing diagram showing the operation of the reverse current prohibiting circuit and the motor driving apparatus in accordance with a preferred embodiment of the present invention.

FIG. 8 is a timing diagram showing the waveforms of the signals relative to the operation of the reverse current prohibiting circuit 190 and the motor driving circuit 180. The level of the switching signals A, B, C, and D indicates the gate control signals of the switches M1, M2, M3, and M4, respectively. The current i(motor) indicate the coil current of the motor. The current signals i(M1), i(M2), i(M3), and i(M4) indicate the current flowing through the switches M1, M2, M3, and M4, respectively. The level of the end voltage Va is the voltage level at the node between switches M1 and M3, the level of the end voltage Vb is the voltage level at the node between the switches M2 and M4. That is, the level of end voltages Va and Vb can be regarded as the voltage levels at the opposite ends of the motor coil 170.

Figure 9:
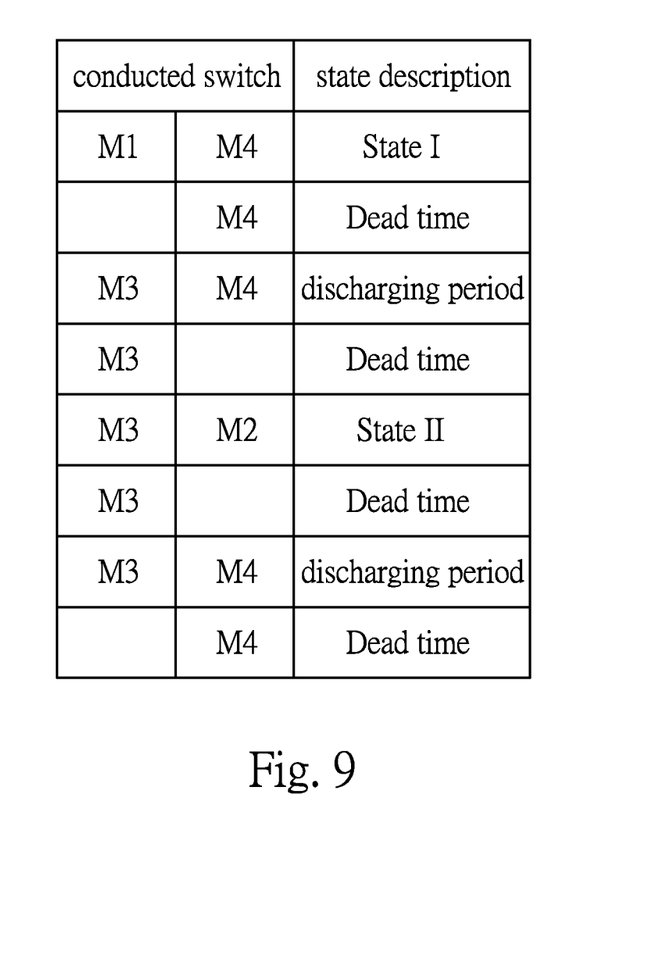
FIG. 9 is a table showing the state change operation of the DC motor in accordance with a preferred embodiment of the present invention, which is carried out by the motor control circuit according to the end voltages of the motor coil.

FIG. 9 shows the state switching process of the motor driving circuit 180 by using the reverse current prohibiting circuit 190 in FIG. 3 to control the on/off state of the switches M1, M2, M3, and M4. Also referring to FIG. 8, in the first conduction period respective to state I, the switching signal A is low and the switching signal D is high to turn on the switches M1 and M4 respectively. At this time, the current i(motor) flows from the left through the coil 170 to the right of this figure, which is defined as a positive current value.

At the end of the first conduction period, the switching signal A is shifted to high to turn off the switch M1 and the switching signal C is shifted to high to turn on the switch M3 such that the discharging period begins. At this time, the power end Vm stops charging the coil 170 but the induction current i(motor) on the coil keeps flowing toward the switch M4 to have the left node of the motor coil 170 showing a negative voltage level at the end voltage Va and the right node showing a positive voltage level at the end voltage Vb. That is, the voltage level difference (Va−Vb) between the two end voltages of the motor coil 170 is negative. The voltage level difference (Va−Vb) would be increased toward zero attending with the discharging of the motor coil 170.

As the absolute value of the voltage level difference (Va−Vb) is smaller than a first predetermined reference voltage level, the reverse current prohibiting circuit 190 generates a discharging control signal Discharge. After receiving the discharging control signal Discharge, the motor control circuit 160 shifts the switching signal B to low to turn on the switch M2 and shifts the switching signal D to low to turn off the switch M4 such that the second conduction period corresponding to state II begins.

At the end of the second conduction period, the switching signal B is shifted to high to turn off the switch M2 and the switching signal D is shifted to high to turn on the switch M4 and the discharging period begins. At this time, the power end Vm stops charging the coil 170, but the induction current i(motor) remains flowing toward the switch M3 to have the left node of the motor coil 170 showing a positive voltage level at the end voltage Va and the right node of the motor coil 170 showing a negative voltage level at the end voltage Vb. Therefore, the voltage level difference (Va−Vb) between the two end voltages of the motor coil 170 is positive. The voltage level difference (Va−Vb) would be reduced toward zero attending with the discharging of the motor coil 170.

As the absolute value of the voltage level difference (Va−Vb) is smaller than a second predetermined reference voltage, the reverse current prohibiting circuit 190 generates a discharging control signal Discharge. After receiving the discharging control signal Discharge, the motor control circuit 160 shifts the switching signal A from high to low to turn on the switch M1 and shifts the switching signal C to low to turn off the switch M3 such that the first conduction period corresponding to the state I begins.

In the transition from the first conduction period to the discharging period of the above mentioned embodiment, both the switches M1 and M3 are switched. In order to prevent short circuit due to simultaneous conduction of switches M1 and M3, as a preferred embodiment shown in FIG. 6, a dead time may be interposed between the first conduction period and the discharging period. That is, prior to the conduction of the switch M3, the switch M1 is turned off first. Similarly, in order to prevent short circuit due to simultaneous conduction of switches M2 and M4, a dead time may be interposed between the discharging period and the second conduction period. That is, prior to the conduction of the switch M2, the switch M4 is turned off first.

According to a preferred embodiment of the present invention, the reverse current prohibiting circuit 190 in accordance with the present invention may be a comparator with two predetermined reference voltage levels. The comparator detects the end voltages Va and Vb at the two ends of the motor coil 170 and generates the discharging control signal Discharge to announce the motor control circuit 160 proceeding state change operation when the absolute value of the voltage level difference (Va−Vb) is smaller than the first predetermined reference voltage level (when the voltage level difference (Va−Vb) is negative) or the second predetermined reference voltage level (when the voltage level difference (Va−Vb) is positive). However, the present invention is not so restricted. The comparator may have only one predetermined reference voltage level and generate the discharging control signal Discharge when the absolute value of the voltage level difference (Va−Vb) is smaller than the predetermined reference voltage level.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A soft switching control circuit for a DC motor, comprising:
   an absolute value generating circuit, generating an absolute value signal according to a pair of Hall signals from the DC motor;
   a threshold voltage generating circuit, receiving a detected state signal and at least an end voltage of a coil of the DC motor for determining a current on the coil at an actual state change time defined by the detected state signal, and adjusting a level of a threshold voltage accordingly; and
   a comparing circuit, comparing the absolute value signal and the threshold voltage so as to generate a state change adjusting signal for adjusting the actual state change time.

2. The soft switching control circuit for a DC motor of claim 1, wherein the threshold voltage generating circuit adjusts the level of the threshold voltage when a positive or a negative current exists on the coil at the actual state change time.

3. The soft switching control circuit for a DC motor of claim 1, wherein the absolute value generating circuit has a voltage level shifting circuit to enhance a level of the absolute value signal and make sure that the level of the absolute value signal is greater than a lower level limit of the threshold voltage.

4. The soft switching control circuit for a DC motor of claim 1, further comprising a logic circuit, receiving the detected state signal and the state change adjusting signal, and adjusting the detected state signal according to the state change adjusting signal so as to generate an adjusted state signal to replace the detected state signal for controlling a switching of the DC motor.

5. The soft switching control circuit for a DC motor of claim 4, wherein the logic circuit shifts the detected state signal backward with an adjusted time period so as to generate the adjusted state signal.

6. The soft switching control circuit for a DC motor of claim 1, wherein the state change adjusting signal is utilized for adjusting a conduction time of at least a switch in an H-bridge for driving the DC motor.

7. The soft switching control circuit for a DC motor of claim 1, wherein the threshold voltage generating circuit has:
   a pulse generating unit, receiving the detected state signal and generating at least a pulse signal accordingly;
   a capacitor, generating the threshold voltage; and
   a threshold voltage adjusting unit, charging or discharging the capacitor at a timing defined by the pulse signal according to the end voltage.

8. The soft switching control circuit for a DC motor of claim 7, wherein the threshold voltage generating circuit has a comparator, which compares the end voltage with a reference voltage so as to generate a comparing signal, and the threshold voltage adjusting unit charges or discharges the capacitor according to the comparing signal.

9. The soft switching control circuit for a DC motor of claim 8, wherein the threshold voltage adjusting unit has a charging path and a discharging path for charging and discharging the capacitor respectively, and on/off state of the charging path or the discharging path is controlled by the respective comparing signal and the respective pulse signal.

10. The soft switching control circuit for a DC motor of claim 7, wherein the pulse signal generating unit has a rising-edge pulse generating circuit for generating a first pulse signal according to the detected state signal and a second pulse signal according to a reversed signal of the detected state signal.

11. The soft switching control circuit for a DC motor of claim 7, wherein the end voltages of the coil received by the threshold voltage generating circuit includes a first end voltage and a second end voltage, and the threshold voltage generating circuit has:
   a first comparator, receiving the first end voltage and a first reference voltage, and generating a first comparing signal accordingly; and
   a second comparator, receiving the second end voltage and a second reference voltage and generating a second comparing signal accordingly;
   wherein the threshold voltage adjusting unit charges or discharges the capacitor according to the first comparing signal and the second comparing signal.

12. The soft switching control circuit for a DC motor of claim 11, wherein a level of the first reference voltage is identical to that of the second reference voltage.

13. The soft switching control circuit for a DC motor of claim 1, wherein the pair of Hall signals is transformed into the detected state signal by using a hysteresis comparator.

* * * * *